United States Patent
Linderoth

Patent Number: 5,472,009
Date of Patent: Dec. 5, 1995

[54] FLUID REGULATOR

[76] Inventor: Sven Linderoth, Vellinge nr 37, S-235 91 Vellinge, Sweden

[21] Appl. No.: 284,579
[22] PCT Filed: Feb. 10, 1993
[86] PCT No.: PCT/SE93/00101
  § 371 Date: Aug. 10, 1994
  § 102(e) Date: Aug. 10, 1994
[87] PCT Pub. No.: WO93/15603
  PCT Pub. Date: Aug. 19, 1993

[30] Foreign Application Priority Data

Feb. 11, 1992 [SE] Sweden ................ 9200388

[51] Int. Cl.⁶ ............................. G05D 11/03
[52] U.S. Cl. .............. 137/101; 137/117; 239/126; 239/127
[58] Field of Search ................ 137/101, 117; 239/126, 127

[56] References Cited

U.S. PATENT DOCUMENTS

| | | | |
|---|---|---|---|
| 2,266,921 | 12/1941 | Trautman | 137/101 |
| 2,844,159 | 7/1958 | Trethewey | 137/101 |
| 3,924,650 | 12/1975 | Parquet | 137/101 |
| 4,877,057 | 10/1989 | Christensen | 137/101 X |

FOREIGN PATENT DOCUMENTS

| | | | |
|---|---|---|---|
| 52334277 | of 0000 | France . | |
| 13332189 | of 0000 | Germany . | |
| 3401734 | 8/1985 | Germany | 239/127 |

Primary Examiner—Robert G. Nilson
Attorney, Agent, or Firm—Ladas & Parry

[57] ABSTRACT

A fluid regulator has two valve bodies (24, 25) placed opposite and cooperating with two openings (22, 23) for controlling the fluid flow from an inlet chamber to two outlet chambers. A spindle (34) interconnects the valve bodies (24, 25) at a predetermined mutual distance forming a spindle assembly. Each valve body and each opening form a passage (30, 31), the sum of the areas of the two passages being constant, but adjustable by a handle (9). The spindle assembly is freely moveable in the axial direction under the influence of the pressures across the openings acting upon the valve bodies so that the pressure drop times the area of each opening is equal for the two openings, and the fluid flow from the inlet chamber is divided into two fluid flows to the outlet chambers. The fluid regulator is intended to be used in an agricultural sprayer for distribution of a fluid composition to soil to be treated. The agricultural sprayer comprises a tank (2), a pump (6), the fluid regulator, and a plurality of nozzles. The fluid regulator divides the fluid flow from the pump into a flow to the nozzles and a surplus flow back to the tank.

10 Claims, 3 Drawing Sheets

FLUID REGULATOR

FIELD OF THE INVENTION

The invention relates to a fluid regulator dividing the fluid flow from a pump into a nozzle part and a surplus part. The fluid regulator is mainly intended for regulating the spray capacity of a agricultural sprayer.

PRIOR ART

An agricultural sprayer comprises a spray ramp having a plurality of nozzles, supplying a composition to the soil to be treated. Such composition can be a fertilizer, herbicide, fungicide, insecticide etc.

The sprayer further comprises a tank for the composition, a pump delivering the composition to the nozzles and regulation valves for controlling the sprayer. The entire assembly is supported by a tractor and the pump is connected to the power outlet of the tractor.

The pump can be of the positive displacement pump type, in which the output is proportional to the speed of the power output and essentially independent of pressure. In this case it is possible to have the ramp nozzles outputting a constant dosage per square meter of soil by allowing the output from the nozzles to become proportional to the power output of the tractor and thus the speed of the tractor.

Such a system is shown in the French Patent Specification No. FR-A-2 334 277. The system comprises a fluid flow divider for dividing the fluid flow from the pump into a first flow to the ramp nozzles and a second flow back to the tank. The flow divider is able to divide the flow very carefully so that a predetermined proportion of the total flow is delivered to the ramp nozzles. However, if some of the ramp nozzles are closed, the flow divider must be readjusted so that the remaining nozzles do not receive an increased amount of the composition.

Another example is shown in German Offenlegungsschrift DE-C1-33 32 189 comprising an adjustable flow control valve and an adjustable return valve. The return valve is combined with a pressure relief valve for avoiding any excessive pressure.

The most common system used on the market today is a pressure regulator comprising an adjustable spring loaded cone throttling against a valve seat for returning a portion of the flow to the tank. In principal, it operates as an adjustable overflow valve and return to the tank the fluid, which does not pass to the spray ramp.

In principle, since the pressure relief valve maintains the output pressure constant to the ramp, the output from each nozzles should be independent of the number of nozzles connected in the ramp, but in practice it is very difficult to manufacture a pressure relief valve which is insensitive to fluid flow. Thus, if some of the nozzles are closed, the output from the remaining nozzles will increase.

A common solution to this problem is to use shut-of valves of the alternating type for each section of the ramp to be controlled. These valves pass the fluid to the respective ramp parts or, alternatively, in return to the tank via suitable throttle valves. With throttle valves properly adjusted, the system operates well. However, the system is complicated with many hoses and valves.

Alternatively, the pump can be of the centrifugal type pump in which the pressure is essentially proportional to the square of the speed of the power output. The output pressure from the pump is throttled by a throttle valve so that the output flow from the ramp nozzles is constant. Also this system is sensitive to partial closure of the ramp nozzles.

There is also a system having a regulator valve, which throttles the pump flow and thus builds up a pressure drop. The pressure drop controls in turn a regulation piston, which controls the return opening. Also this system is unduly complicated and service demanding.

The regulation can also take place with a control computer. However, this is an expensive solution.

SUMMARY OF THE INVENTION

The object of the present invention is to provide a fluid regulator for the above-mentioned agricultural sprayer, which can be used irrespective of what type of pump that is used and still provide an output flow which is essentially proportional to the power output of the tractor.

Another object of the invention is to provide a fluid regulator having a constant output pressure (at constant speed of the power output of the tractor) independent of how many ramp nozzles are connected or closed.

Thus, there is provided according to the invention a flow compensated fluid regulator, comprising an inlet chamber and two outlet chambers, two openings connecting said inlet chamber with corresponding outlet chambers, two valve bodies placed opposite and cooperating with said openings for controlling the fluid flow from said inlet chamber to said outlet chambers, and a spindle interconnecting said valve bodies at a predetermined mutual distance forming a spindle assembly. Each valve body and each opening form a passage having a width, the sum of the widths of said two passages being constant, due to the interconnection of the valve bodies by the spindle. According to the invention, the ratio between the effective areas of said two openings is less than one; and said spindle assembly being freely moveable in the axial direction under the influence of the pressures across the openings acting upon the valve bodies so that the pressure drop times the area of each opening being equal for the two openings, and dividing the fluid flow from the inlet chamber into two fluid flows to the outlet chambers. The predetermined distance between the valve bodies is adjustable for example by a handle.

BRIEF DESCRIPTION OF THE DRAWING

The invention is described in more details below with reference to the drawings in which.

DETAILED DESCRIPTION OF THE PREFERRED EMBODIMENT

Figure 1:
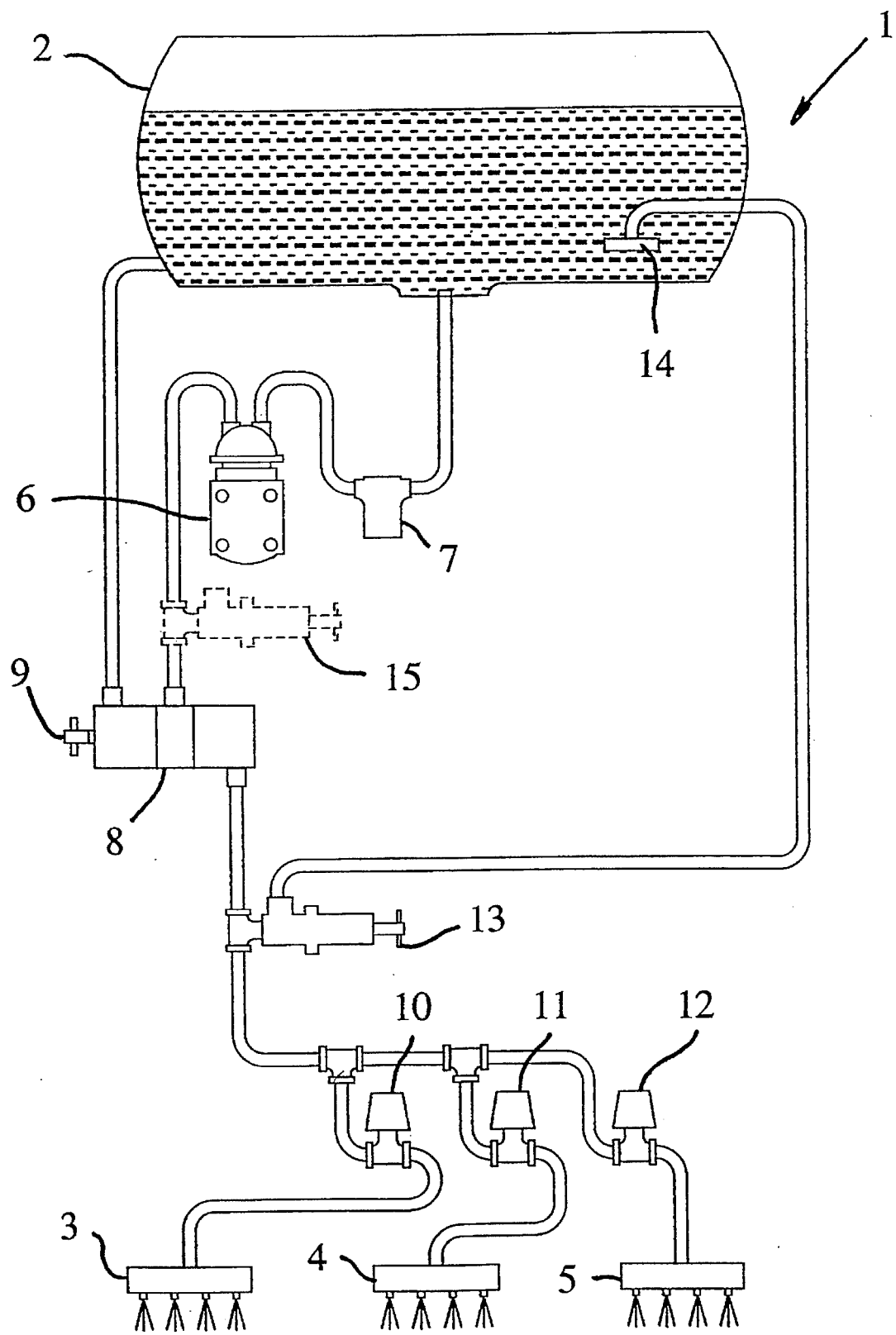
FIG. 1 is a schematic view of a agricultural spray ramp system in which the fluid regulator according to the invention is used.

FIG. 1 shows an agricultural spray ramp system having a valve according to the invention. The system 1 comprises a tank 2 for the agricultural composition to be fed to the soil via spray boom sections 3, 4, 5. The composition can be a fertilizer, herbicide, fungicide, insecticide etc.

A pump 6 is connected to the tank 2 preferably via a strainer 7 for excluding particles above a certain size. The outlet of the pump is connected to a fluid regulator 8 according to the invention, dividing the flow from the pump into a surplus flow returning to the tank and a fluid flow connected to the spray boom sections 3, 4 and 5. The fluid regulator comprises a handle 9 for adjustment thereof. Each spray boom section is controlled by a shut-off valve 10, 11 and 12, by means of which the nozzles of the boom sections can be connected or disconnected to the system. A throttle valve 13 connects the output of the fluid regulator to an agitator 14 positioned in the tank 2.

If the pump is of the centrifugal type, it is preferred to provide a throttle valve 15 between the pump 6 and the fluid regulator 8 as shown by dotted lines in FIG. 1.

The shut-off valves 10, 11 and 12 can be manually operated or having a solenoid operation for remote electric control thereof.

The operation of this agricultural spray ramp system is obvious. The pump is driven from the power outlet of a tractor, which also transports the entire ramp system over a soil to be treated. The fluid regulator according to the invention provides a constant flow to the booms 3, 4 and 5, which is proportional to the speed of the tractor and is adjustable by means of the handle 9 of the fluid regulator (and/or throttle valve 15 if present).

If one or several of the boom sections are closed, the fluid regulator automatically switches the flow intended for such boom sections via the surplus line to the tank, thus maintaining the output constant from each boom section.

Figure 2:
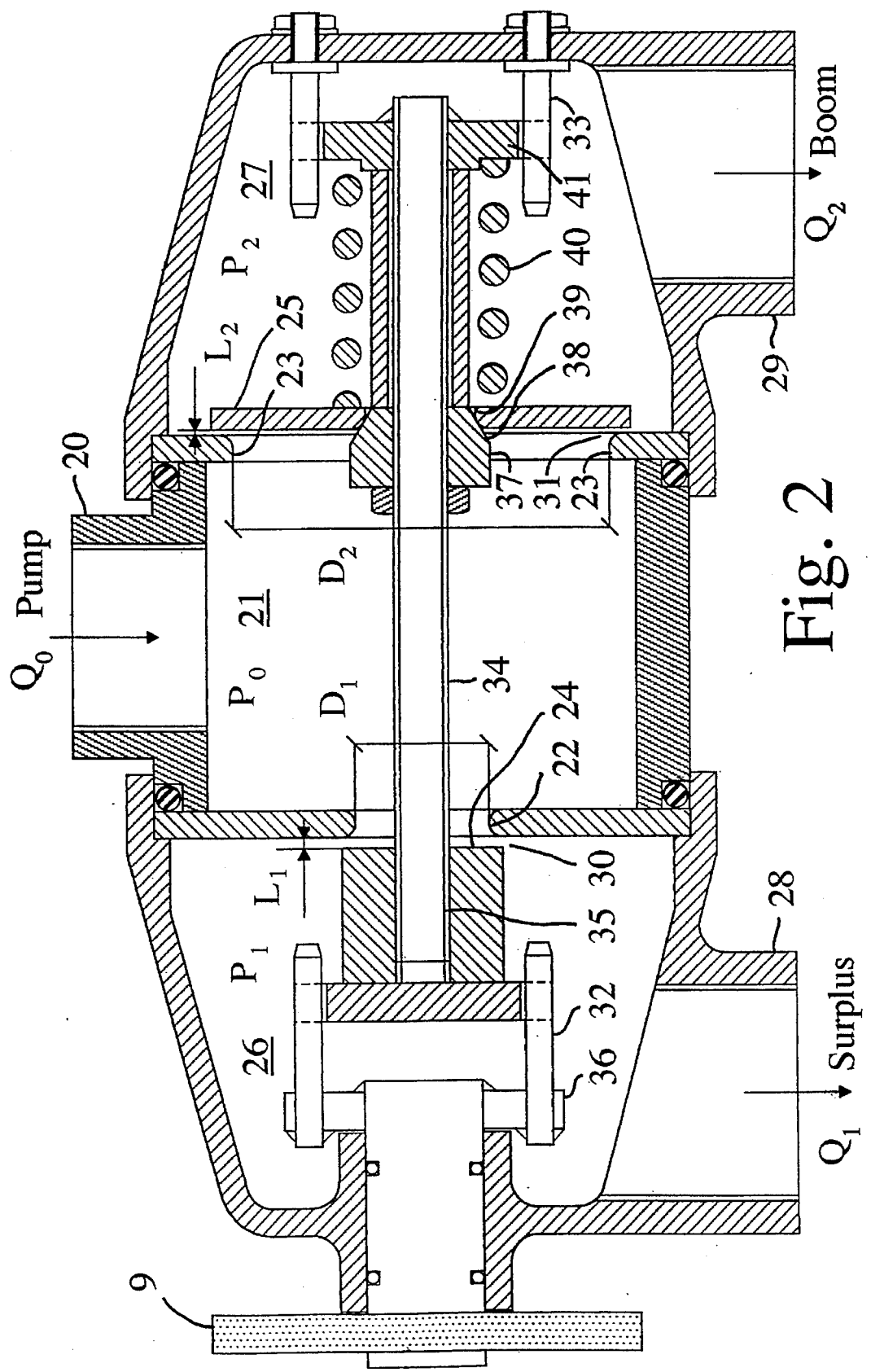
FIG. 2 is a cross-sectional view of a preferred embodiment of the fluid regulator.

In FIG. 2 the fluid regulator is shown in cross-section. The fluid regulator 8 comprises an inlet 20 from the pump 6 leading to an inlet chamber 21 having two outlet openings 22 and 23. The outlet openings 22 and 23 form valve seats for cooperation with two valve disks 24 and 25. The openings 22 and 23 are preferably circular with effective diameters "$D_1$" and "$D_2$".

The first opening 22 opens to a first chamber 26 having an outlet 28 connected to the tank 2 as the surplus line mentioned above. The second opening 23 opens to a second chamber 27 having an outlet 29 connected to the boom sections 3, 4, 5 and also connected to the agitator 14 in the tank 2 via throttle valve 13.

Valve disk 24 is positioned in chamber 26 opposite the opening 22 and forms therebetween an annular passage 30 from chamber 21 to chamber 26 having a width of "$L_1$". Valve disk 25 is positioned in chamber 27 opposite the opening 23 and forms therebetween an annular passage 31 from chamber 21 to chamber 27 having a width of "$L_2$".

Valve disk 24 is moveable inside chamber 26 only in the axial direction and is controlled by several guiding pins 32. Valve disk 25 is moveable inside chamber 27 only in the axial direction and is controlled by several guiding pins 33. The two valve disks 24 and 25 are interconnected by a spindle 34 so that they move in ensemble in the axial direction.

The first valve disk 24 is connected to the spindle 34 via threads so that the axial position on the spindle can be adjusted. The axial position of valve disk 24 on the spindle 34 is controlled by a handle 9 connected to a support member 36 for said guiding pins 32. At rotation of the handle 9, the support member 36 and the guiding pings 32 transmit the rotating movement to the valve disk 24. Since the spindle is prevented from rotation, the valve disk 24 is moved in the axial direction relative to the spindle.

Said rotation of the handle 9 can take place manually as well as by means of a motor, which can be remotely controlled.

The second valve disk 25 is constructed as a combined pressure relief valve. A body 37 is attached to the spindle and exposes a conical surface 38 towards a central hole 39 in the valve disk 25. A spring 40 urges the valve disk 25 towards the conical surface. The spring 40 is interposed between said valve disk 25 and a shoulder member 41 attached to the end of the spindle 34. The shoulder member 41 also cooperates with said guide pins 33 for preventing rotation of the spindle but allowing free axial movement of the spindle. Thus, if an excessive pressure prevails in the inlet chamber, the spring 40 will be compressed and open the valve disk 24 via spindle 34.

Moreover, the valve disk 25 is tiltable and can adjust itself to the edges of the opening 23 under the influence of the spring 40. Thus, the width $L_2$ of the passage between the valve disk 25 and the edge of the opening will be uniform around the periphery independent of any manufacturing tolerances.

Preferably, the central hole 39 in the valve disk is also conical, but preferably with another cone angle compared with the cone angle of the conical surface 38. The conical surface 38 could alternatively be spherical which also is applicable to the central hole.

The object of the invention is to maintain the output pressure from the fluid regulator constant even if one or several boom sections are closed, if the speed of the tractor is constant. This object can be achieved if the output pressure from the fluid regulator is constant and if the input flow to the fluid regulator is independent of the closure of the boom sections, thereby maintaining the input pressure and input flow constant.

The pressure in the input chamber 21 is $P_0$ and the input flow to said chamber is $Q_0$. The pressure in the first chamber 26 is $P_1$ and the output flow from said chamber is $Q_1$. The pressure in the second chamber 27 is $P_2$ and the output flow from said chamber is $Q_2$. Since the two valve disks 24 and 25 are interconnected, and since the spindle 34 must be in balance, the following relations are valid:

$$(P_0-P_1)\pi(D_1/2)^2 = (P_0-P_2)\pi(D_2/2)^2 \quad (1)$$

and therefrom $$P_2 = P_1 + (P_0-P_1)(1-(D_1/D_2)^2) \quad (2)$$

Thus, if the pressure $P_1$ is small or zero, the pressure to the boom sections is proportional to the input pressure $P_0$. If the ratio $D_1/D_2$ is 0,4, the pressure $P_2$ is about 84% of the total pressure $P_0$. Thus, if the input pressure is constant, the output pressure will be constant.

The distance between the two valve disks is determined by rotation of the handle 9. Thus, the widths of the annular passages 30, 31 from inlet chamber 21 to chambers 26 and 27 can be adjusted. The flow through each annular passage is the same as the flow passing out through outlets 28 and 29, i.e. $Q_1$ and $Q_2$, respectively. The flow through each annular passage is proportional to the area of the passage times the square root of the pressure differential times a constant, which is dependant of the shape of the annular passage. The following relations are valid:

$$Q_1 = k_1 L_1 \pi D_1 \sqrt{P_0 - P_1} \quad (3)$$

$$Q_2 = k_2 L_2 \pi D_2 \sqrt{P_0 - P_2} \quad (4)$$

From equation (1) is obtained:

$$D_1 \sqrt{P_0 - P_1} = D_2 \sqrt{P_0 - P_2} \tag{5}$$

and thus if $k_1 = k_2 = k$ $$Q_0 = k \pi D_2 \sqrt{P_0 - P_2} \; (L_1 + L_2) \tag{6}$$

$$\frac{Q_1}{Q_2} = \frac{L_1}{L_2} \tag{7}$$

$$Q_2 = Q_0 \frac{L_2}{L_1 + L_2} \tag{8}$$

Thus, it appears according to equation (6) that the input flow $Q_0$ is independent of the exact position of the spindle assembly if $(L_1+L_2)$ is constant. Since $P_0$ and $P_2$ is constant as mentioned above, the input flow $Q_0$ is constant and independent of output flow $Q_2$. The input flow $Q_0$ is divided into an output flow $Q_2$ and an surplus flow $Q_1$, the division being made so that the output pressure $P_2$ is constant. If the output flow decreases due to closure of a boom section, then the surplus flow increases with the same amount.

From the above equations, it is also evident that, if the speed of the tractor increases, the input flow to the fluid regulator increases proportionally (if the pump is of the positive displacement type). However, the position of the spindle is not influenced by the input flow, and thus the output flow $Q_2$ is proportional to the input flow $Q_0$ according to equation (8). Thus, it is possible to maintain a constant dosage per squaremeter even at closure of boom sections.

From equation (1) it is evident that the ratio $D_1/D_2$ is important for the proper operation of the fluid regulator. If this ratio is 1, i.e. if $D_1=D_2$, the pressures $P_1$ and $P_2$ are equal and no regulation of the flows will take place, if said ratio is small, then pressure $P_2$ is proportional to input pressure $P_0$ and essentially independent of pressure $P_1$. In this case the regulator balances the flows $Q_1$ and $Q_2$ for maintaining said proportionality. However, if said ratio is very small, then the first opening will be too small or the second opening will be impractically large. Thus, a ratio between 0.01 and 0.07 have shown to provide a fluid regulator with a good regulation. However, a ratio of between 0.13 and 0.15 is preferred of practical reasons.

For the proper operation of the invention, it is important that $k_1=k_2$. If the edges of the openings 22 and 23 are rounded as shown in the drawing, than the streaming coefficient is close to one, about 0.95–0.98, and the relation $k_1=k_2$ is valid.

Figure 3:
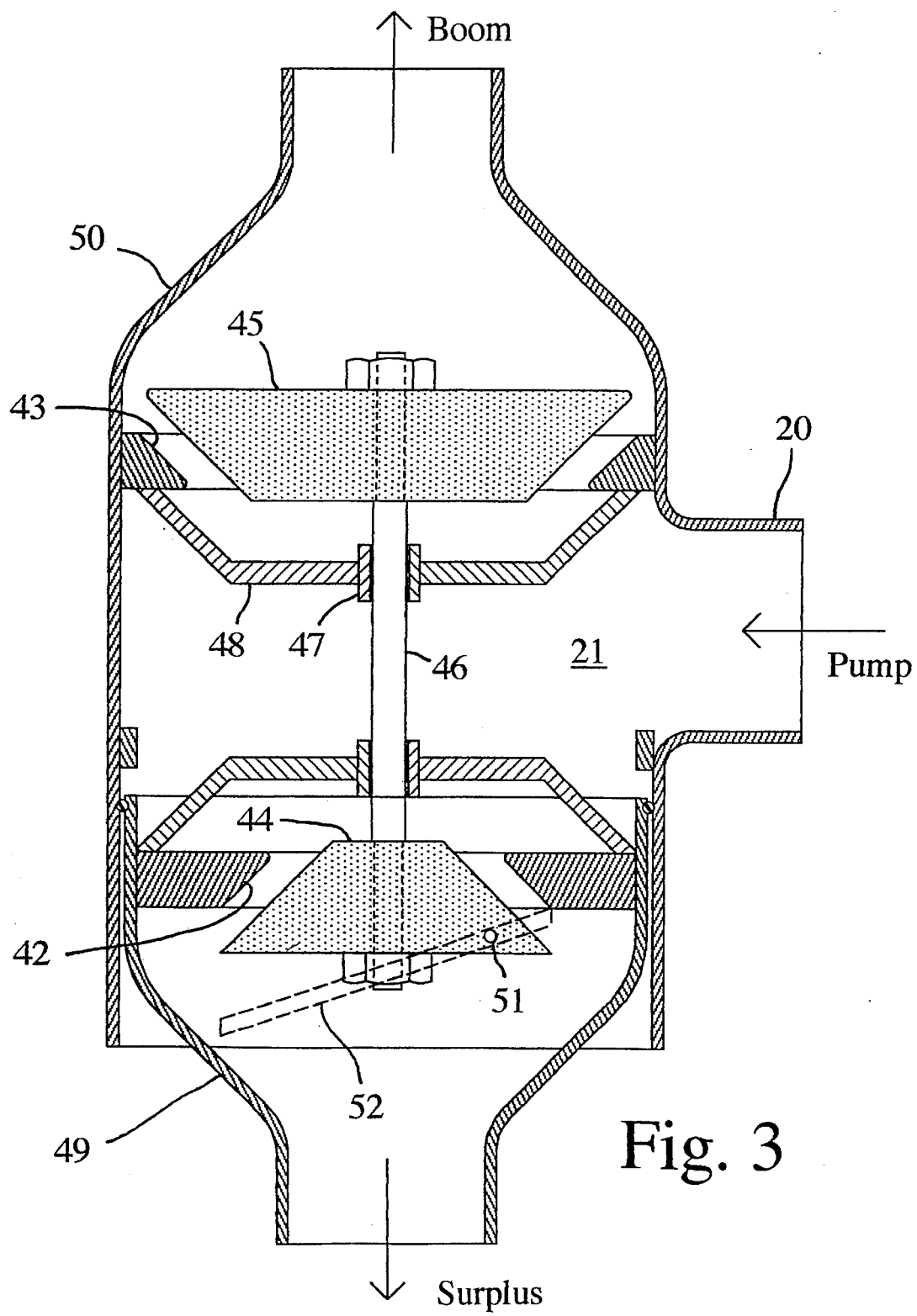
FIG. 3 is a cross-sectional view of another embodiment of the fluid regulator.

In FIG. 3, a second embodiment of the fluid regulator according to the invention is shown in cross-section. The same part as in FIG. 2 has the same reference numbers, in this case, each valve body 44, 45 is conical and the wall of the corresponding opening 42, 43 is conical. The valve bodies are interconnected by a spindle 46 and the spindle assembly is free to move in the axial direction and is journalled by one or several sleeves 47 connected to each opening plate by several radial ribs 48. Since the valve bodies are conical, the spindle assembly can move over a greater distance in adjusting itself to different flows, and thus it will be less sensitive to manufacturing tolerances of the valve bodies and the openings.

The housing enclosing the inlet chamber and outlet chambers is divided in two portions 49, 50 which are moveable in relation to each other for changing the distance between the two openings, thereby adjusting the sum $L_1+L_2$. A stem 51 attached to one portion of the housing cooperates with an inclined slit 52 in the other portion of the housing so that the distance between the openings is adjusted in dependence of relative rotation of the two housing portions. Other means of adjusting the relative position of the housings can be used, such as screw windings or a solenoid operated member, for electrical control or a motor.

In the above-mentioned embodiments, the openings are circular, but it is realized that other shapes of the openings will operate in a similar way, e.g square openings etc.

Another specific advantage is obtained by the use of the pressure relief assembly comprising the spring 40 and disk 25 with hole 39. It is often difficult to empty the tank completely because when the level is low in the tank, air will mix in the fluid supplied from the tank decreasing the input pressure $P_0$. When air is mixed in the fluid, the pressure will easily escape via the throttle valve 13 and agitator 14. When the pressure at each nozzle decreases below a certain level, the outlet nozzle will be closed by the drop protection. In order to empty the tank completely, the throttle valve 13 is closed so that no pressure will escape via the agitator 14. Moreover, the handle 9 is rotated so that (L1+L2) is zero, i.e. so that the disks 24 and 25 abut the openings 22 and 23. Then, handle 9 is further rotated whereby the spring 40 is compressed and hole 39 is opened. In this position the entire pressure of the pump is transmitted to the nozzles, since the surplus line is closed as well as the agitator line. Now, the pump is in a position to empty the tank almost completely overcoming the drop protection pressure in each nozzle.

From the above, it is evident that according to the invention has been provided a fluid regulator dividing the fluid flow from a pump into a flow to a plurality of nozzles and a surplus flow back to a tank. The regulator maintains the output pressure to the nozzles constant at closure of one or several nozzles and redirects as the flow intended for the closed nozzles back to the tank without any influence upon the pump, and thus the dosage per squaremeter is automatically maintained constant when a portion of the nozzles are closed.

Hereinabove, preferred embodiments of the invention has been described with reference to the appended drawings. However, said embodiments are given only as examples and the invention is not limited to these embodiments, but only of the appended patent claims.

What is claimed is:

1. A fluid regulator comprising:
   an inlet chamber (21) and two outlet chambers (26, 27);
   two openings (22, 23) connecting said inlet chamber with corresponding outlet chambers;
   two valve bodies (24, 25) placed opposite and cooperating with said openings (22, 23) for controlling the fluid flow from said inlet chamber to said outlet chambers;
   a spindle (34) interconnecting said valve bodies (24, 25) at a predetermined mutual distance forming a spindle assembly;
   each valve body and each opening forming a passage (30, 31) having a width ($L_1$, $L_2$), the sum of the widths ($L_1+L_2$) of said two passages being constant, due to the interconnection of the valve bodies (24, 25) by the spindle;
   characterized in that
   the ratio between the effective areas of said two openings (22, 23) being less than one; and
   said spindle assembly being freely moveable in the axial direction under the influence of the pressures across the openings acting upon the valve bodies so that the pressure drop times the area of each opening being equal for the two openings, and dividing the fluid flow from the inlet chamber into two fluid flows to the outlet chambers.

2. A fluid regulator according to claim 1, characterized in that said sum of the widths ($L_1+L_2$) being adjustable.

3. A fluid regulator according to claim 2, characterized in that said predetermined distance between the valve bodies is adjustable by means of a screw thread of the spindle cooperating with a screw thread of one of the valve bodies, so that the distance between the valve bodies can be adjusted by relative rotation between the valve body and the spindle.

4. A fluid regulator according to claim 2, characterized in that said sum of the widths ($L_1+L_2$) is adjustable by adjusting the distance between said openings (22, 23).

5. A fluid regulator according to claim 1, characterized in that said ratio between the two areas ($(\pi D_1/\pi D_2)^2$) being between 0.01 and 0.49.

6. A fluid regulator according to claim 1, characterized in that one of said valve bodies comprises an pressure relief valve comprising a spring (40) and a disk (25) for relieving any overpressure.

7. A fluid regulator according to claim 1, characterized in that said disk (25) comprises a central hole (39) cooperating with an inclined of spherical surface (38) of a support member (37), whereby said disk can be tilted for adapting itself to the edges of the corresponding opening.

8. A fluid regulator according to claim 1, characterized in that the edges of said openings are rounded for maintaining the fluid flow coefficient thereof close to one.

9. The use of a fluid regulator according to claim 1 in an agricultural sprayer for distribution of a fluid composition to a soil to be treated, said agricultural sprayer comprising a tank (2), enclosing said composition, a pump (6), the inlet of which being connected to said tank (2) and the outlet of which being connected to the inlet chamber of said fluid regulator, the first outlet chambers of which being connected back to the tank via a surplus line and the second outlet chamber of which being connected to a plurality of nozzles for delivering the composition to the soil, said fluid regulator dividing the fluid flow from the pump into a flow to the plurality of nozzles and a surplus flow back to the tank.

10. A fluid regulator according to claim 1, characterized in that said ratio between the two areas ($(\pi D_1/\pi D_2)^2$) is between 0.09 and 0.25.

* * * * *